United States Patent
Bendel et al.

(10) Patent No.: US 10,407,952 B2
(45) Date of Patent: Sep. 10, 2019

(54) METHOD FOR PRODUCING MOTOR VEHICLE LOCKS WITH AN OBLIQUE MAIN LATCH CONTOUR

(71) Applicant: Kiekert Aktiengesellschaft, Heiligenhaus (DE)

(72) Inventors: Thorsten Bendel, Oberhausen (DE); Werner Pohle, Dortmund (DE); Thomas Waldmann, Mulheim Ruhr (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 674 days.

(21) Appl. No.: 14/650,612

(22) PCT Filed: Dec. 11, 2013

(86) PCT No.: PCT/DE2013/000770
§ 371 (c)(1),
(2) Date: Jun. 9, 2015

(87) PCT Pub. No.: WO2014/090215
PCT Pub. Date: Jun. 19, 2014

(65) Prior Publication Data
US 2015/0330119 A1    Nov. 19, 2015

(30) Foreign Application Priority Data
Dec. 11, 2012    (DE) .................. 10 2012 024 209

(51) Int. Cl.
*E05B 85/24*    (2014.01)
*E05B 79/10*    (2014.01)
(Continued)

(52) U.S. Cl.
CPC ........... *E05B 85/243* (2013.01); *B21D 22/02* (2013.01); *B21D 53/28* (2013.01); *B23P 15/14* (2013.01);
(Continued)

(58) Field of Classification Search
CPC ...... E05B 85/26; E05B 79/10; E05B 17/0004; E05B 77/36; E05B 77/40; B21D 22/02;
(Continued)

(56) References Cited

U.S. PATENT DOCUMENTS 1,401,666 A * 12/1921 Brandenburg .......... B24B 53/14
                                                                    125/37
2,146,548 A *  2/1939 Mitschang ............. B24D 13/00
                                                                    451/510
(Continued)

FOREIGN PATENT DOCUMENTS

DE    102007060626 A1 *  6/2009 ......... E05B 17/0004
DE    102007060626 A1     6/2009
(Continued)

OTHER PUBLICATIONS

Machine translation of DE102007060626A1 by Lexis Nexis Total Patent on Jul. 15, 2015.
(Continued)

*Primary Examiner* — Mark A Williams
(74) *Attorney, Agent, or Firm* — Woodard, Emhardt, Henry, Reeves & Wagner, LLC

(57) ABSTRACT

In order to minimize the sliding friction occurring between the locking parts, that is, between the pawl and the rotary latch of a motor vehicle lock, it is advantageous if, during the machining process, the different latch surfaces of both locking parts are provided with a punched contour and with a contour having a oblique machining groove. Machining grooves are formed, in particular on the latch surface
(Continued)

thereof, after stamping the pawl. Defined shapes of oblique channels and/or machining grooves are produced, for example, by milling out the machining grooves. The oblique machining grooves are produced at a defined angle and guarantee that the straight channels on the rotary latch only have a few overlapping points with the oblique grooves, if both locking parts come into contact with each other.

18 Claims, 2 Drawing Sheets

(51) Int. Cl.
  *B21D 22/02* (2006.01)
  *B21D 53/28* (2006.01)
  *B23P 15/14* (2006.01)
  *E05B 85/26* (2014.01)
  *E05B 77/40* (2014.01)
(52) U.S. Cl.
  CPC ............. *E05B 77/40* (2013.01); *E05B 79/10* (2013.01); *E05B 85/26* (2013.01); *Y10T 29/49474* (2015.01); *Y10T 292/1075* (2015.04)
(58) Field of Classification Search
  CPC .. B21D 28/16; Y10T 29/49474; Y10S 292/64
  See application file for complete search history.

(56) References Cited

U.S. PATENT DOCUMENTS

| | | | |
|---|---|---|---|
| 9,810,007 B2* | 11/2017 | Bendel | B21D 53/38 |
| 2011/0316293 A1* | 12/2011 | Luschper | E05B 79/20 |
| | | | 292/195 |
| 2012/0313384 A1* | 12/2012 | Cumbo | E05B 81/14 |
| | | | 292/199 |
| 2015/0315827 A1* | 11/2015 | Bendel | E05B 77/36 |
| | | | 292/195 |

FOREIGN PATENT DOCUMENTS

| | | |
|---|---|---|
| DE | 10 2009 037 663 A1 | 1/2011 |
| DE | 102010009141 A1 | 8/2011 |

OTHER PUBLICATIONS

Machine translation of DE102010009141A1 by Lexis Nexis Total Patent on Jul. 15, 2015.
German Office Action issued in related DE 10 2012 024 209.3 dated Nov. 13, 2013 (pp. 2).
Machine translation of DE 10 2009 037 663A1 by European Patent Office Patent Translate on Mar. 7, 2019 (pp. 29).

* cited by examiner

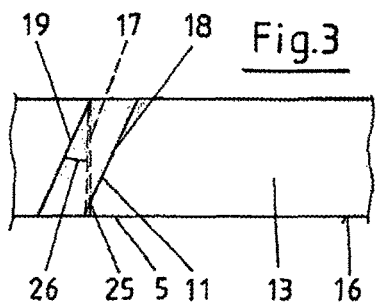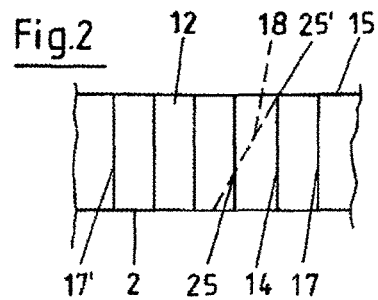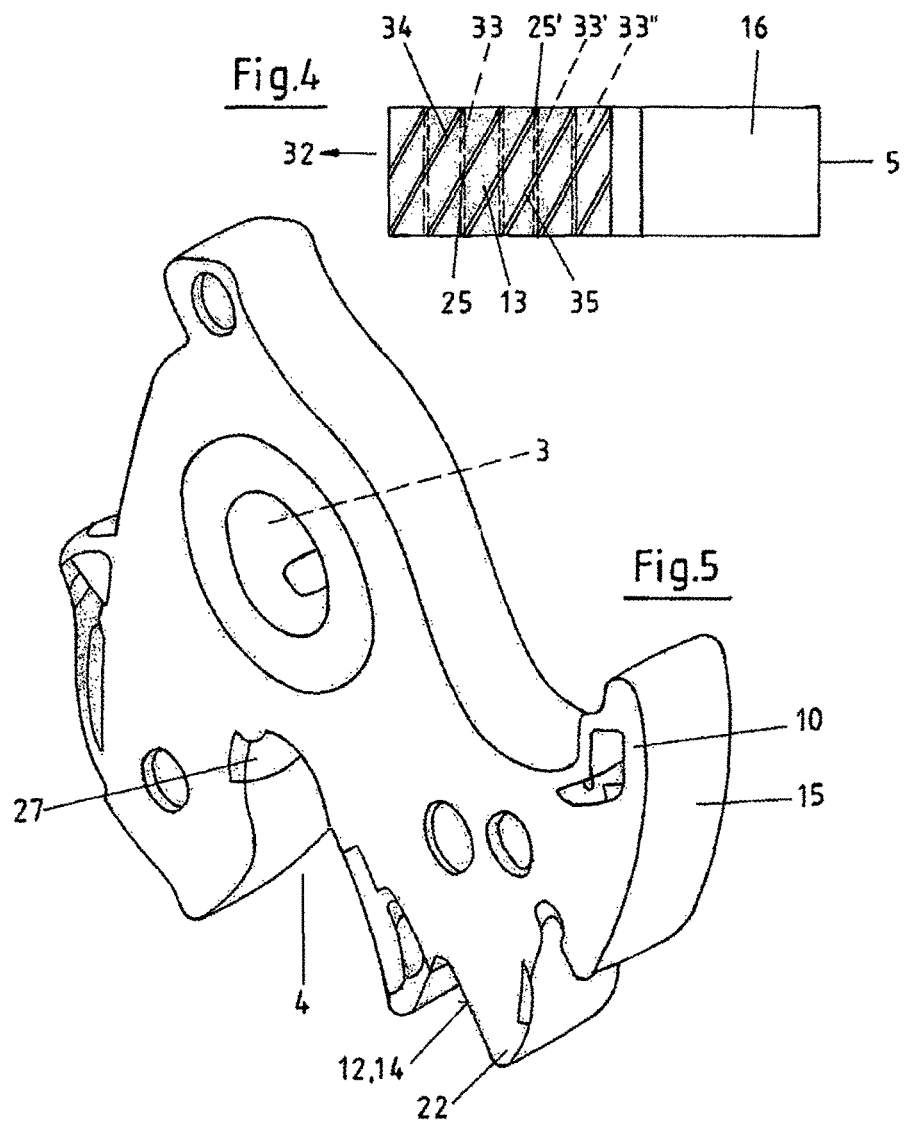

METHOD FOR PRODUCING MOTOR VEHICLE LOCKS WITH AN OBLIQUE MAIN LATCH CONTOUR

CROSS-REFERENCE TO RELATED APPLICATIONS

This application is the U.S. national stage application of International Patent Application No. PCT/DE2013/000770, filed Dec. 11, 2013, which claims priority of German Application No. 10 2012 024 209.3, filed Dec. 11, 2012, which are both hereby incorporated by reference.

BACKGROUND

The invention relates to a procedure to produce the locking mechanisms catch and pawl of a latch, whereby the catch and pawl are stamped out simulatingly vertical or virtually vertical edges with corresponding ratchet surfaces for the catch and pawl and are then equipped with a casing, with the ratchet surfaces being kept free. The invention also concerns a latch with a catch and a pawl which locks the catch in the closed state, whereby the catch and pawl demonstrate corresponding ratchet surfaces on the vertical edges arising during stamping and casing which releases the ratchet surfaces.

From DE 10 2010 009 141 A1 it is known to provide for especially designed bracket sides in order to attain a design which is low-noise and which optimally transfers the forces arising during driving of the motor vehicle. The outside wall of the bracket side is equipped with a surface structure, especially in the contact area, which consists of grooves or relevant bars running obliquely to the longitudinal axis of the bracket side. Alongside the relevant design of the bracket side it is also known according to the theory of DE 10 2010 009 141 A1 to equip the catch in the area of the mounting with an identical or similar surface structure to that of a bracket side in order to prevent the so-called creaking in particular. The relevant solutions revealed in this step provide all artificially produced surface structures from bars or grooves which are therefore applied onto the already available surface of the bracket side or also the catch in a separate work process. These solutions do not take into account the fact that during the actual production of the bracket side and in particular the locking mechanisms catch and pawl on the corresponding ratchet surfaces a surface which encourages creaking is present. During stamping, grooves are formed on the edge surfaces which can interlock in particular during pivoting away of the pawl.

SUMMARY

The present invention is based on the task of minimising the noises arising during opening and closure of the latch in the area of the ratchet surfaces of the catch and pawl.

After stamping of the locking mechanisms, the task is solved procedurally by at least the edge surface of one of the locking mechanisms being processed in the ratchet area with a tool which produces oblique contours.

When the locking mechanisms are stamped with the customary stamping technique, straight contours are formed on the edge surface of the locking mechanisms in the ratchet area of both locking mechanisms which exert friction on one another during opening and closure of the latch, i.e. on insertion of the pawl and cause noises which are also described as creaking.

Due to the fact that in accordance with the invention in the ratchet area of preferably the pawl a separate oblique contour is applied, the detrimental noises cannot occur because the sliding friction due to the punctiform lying on top of one another of the two locking mechanisms in the ratchet area cannot result in hindrance due to the straight and oblique contour. For example, a straight contour, i.e the stamping contour, is present on the catch in the area of the ratchet surfaces while an oblique contour is specifically produced by a separate tool in the corresponding ratchet area of the pawl. This considerably reduces noise when the motor vehicle door is opened and closed.

According to an appropriate design of the invention, it is envisaged that with the aid of subsequent processing on the locking mechanism via mechanical erosion in the ratchet area the oblique contour is inserted. Any tools can be used as tools, but preferably tools which mechanically erode the locking mechanism. Therefore specifically oblique grooves are produced which only demonstrate specific covering in certain points with the straight stamping grooves of the other locking mechanism which leads to the noise reduction already described.

A further appropriate design envisages that stamping takes place in the first procedural step and that an oblique contour is milled into the locking mechanism, preferably the pawl, in a second or further procedural step. With such a milling, an oblique contour can be produced on the pawl specifically and also in a targeted characteristic whereby this also takes place dependent on the stamping grooves present on the other locking mechanism.

It is therefore important to design the contour in the ratchet area of both locking mechanisms at different gradients. Consequently, considerably fewer contact points are present between the two surfaces. This is attained in accordance with the invention in particular by grooves and/or machining grooves being entered into the locking mechanism/ratchet area as an oblique contour which in contrast to the straight stamping grooves is shaped at an angle into the ratchet surface of the locking mechanism. While the stamping grooves are straight, the grooves produced in a separate processing step are arranged obliquely such that a certain covering of the stamping grooves and grooves always occurs as already mentioned. An interlocking or even pre-ratcheting of the stamping grooves of both locking mechanisms is precluded.

In addition to the design described above, it is envisaged that the grooves and/or machining grooves are moulded into the locking mechanism to be subsequently processed dependent on the thickness of the locking mechanism and the distance of the grooves to be expected at an angle of 5-15° and with a covering of at least two grooves of the oblique grooves and the straight stamping grooves of the opposite locking mechanism. The grooves and/or machining grooves produced subsequently are also at an angle to the stamping grooves produced during stamping of the relevant processing part, i.e. preferably the pawl in the angle, whereby these stamping grooves cannot come into contact with the straight stamping grooves of the opposite locking mechanism because the grooves and/or machining grooves produced subsequently are more marked than the present stamping grooves.

According to a further design, it is intended to insert oblique grooves in the ratchet area of the pawl and the catch, the orientation of which is in the opposite direction or the same direction and which guarantee specific covering of preferably two grooves of both locking mechanisms. In this design, subsequent processing is therefore necessary for both locking mechanisms but leads to the advantage that both grooves produced subsequently can be marked in such a way that the targeted covering is also always actually attained.

In accordance with the device, the task is solved by a locking mechanism, preferably the pawl in the ratchet surface demonstrating a separately produced oblique contour while the other locking mechanism, i.e. the catch is equipped with a stamping contour demonstrating straight-line grooves produced during stamping.

Both locking mechanisms in accordance with this design demonstrate different contours which guarantee that, in particular during the opening process, the pivoting pawl still only produces slight noise pollution. This is attained by, for example, the pawl demonstrating a separately produced oblique contour while the catch only possesses the straight grooves produced during stamping or a relevant stamping contour. Both surfaces are thus not fully on top of one another, but only in the area of the cover of the relevant contours. Consequently, noise pollution is specifically reduced.

In accordance with the theory in accordance with the invention, oblique grooves are preferably produced on the pawl in a separate work process. In order to optimally create the shape and ultimately the effect of these grooves, the invention envisages that the oblique grooves are formed on the ratchet surface of the pawl in the form of milling grooves. Both the shape and the oblique nature of the milling grooves can be set precisely so that the relevantly produced oblique grooves/milling grooves then guarantee constantly uniform sliding friction on the ratchet surface of the catch or the stamping grooves present there.

Above, it is indicated that the design of the catch and the pawl with straight stamping grooves in each instance can lead to disadvantageous interlocking of the grooves. This is prevented with the locking mechanisms designed in accordance with the invention as the grooves on the ratchet surfaces of the locking mechanisms are designed to prevent an interlocking of the stamping grooves and the separately inserted grooves. This must be attained in particular with the described milling grooves as the shape and height of the relevant grooves or milling grooves can then be precisely specified.

In order to ensure the desired covering between the straight stamping grooves and the oblique grooves on the pawl, it is expedient if the angle between the straight stamping grooves and the oblique grooves is 5-15° dependent on the thickness of the locking mechanism and the distance of the straight stamping grooves. With the aid of relevantly oblique grooves on the pawl, optimal covering of the straight stamping grooves and the oblique grooves is attained.

The other expedient design of the present invention is that in which the oblique grooves in the opening direction of the pawl are arranged at an incline. Thus, the particular stress occurring during opening, i.e. on pivoting of the pawl from the closed position, is taken into account, because then both locking mechanisms, in certain circumstances promoted by the movement of the vehicle, are pressed especially closely to one another. When the latch is closed again and the pawl pivots back into the ratchet position, the two locking mechanisms glide onto one another in a less pressure-loaded manner.

The invention is characterised in particular by a latch being created with an extremely low additional manufacturing cost in which the catch and the pawl in the contact area, i.e. in the ratchet surface and preferably in the main ratchet surface are designed in such a way that reduction of the noise pollution is attained in particular by reduction of the sliding friction. Both locking mechanisms are initially stamped and then the surface preferably of the pawl in the area of the ratchet surface is processed separately in order to attain an oblique contour. This is attained in particular by the oblique contour being milled into the pawl. The milling grooves thus arising can be designed dependent on expediency and in any case guarantee that the straight grooves and the oblique grooves lead to considerably reduced contact of both surfaces or ratchet surfaces.

Further details and advantages of the invention result from the following description of the pertaining sketch, in which a preferred design example is depicted with the necessary details and individual components.

BRIEF DESCRIPTION OF THE DRAWINGS

FIG. 2 an enlarged reproduction of the edge view, here of the catch in the area of the ratchet surfaces, FIG. 3 an enlarged reproduction of the ratchet surface of the pawl with oblique grooves, FIG. 4 a top view similar to FIG. 3 with the oblique grooves and the indicated straight-line grooves of the catch with the covering points and FIG. 5 with a perspective reproduction of the catch with the edge design

DETAILED DESCRIPTION OF THE DRAWINGS

Figure 1:
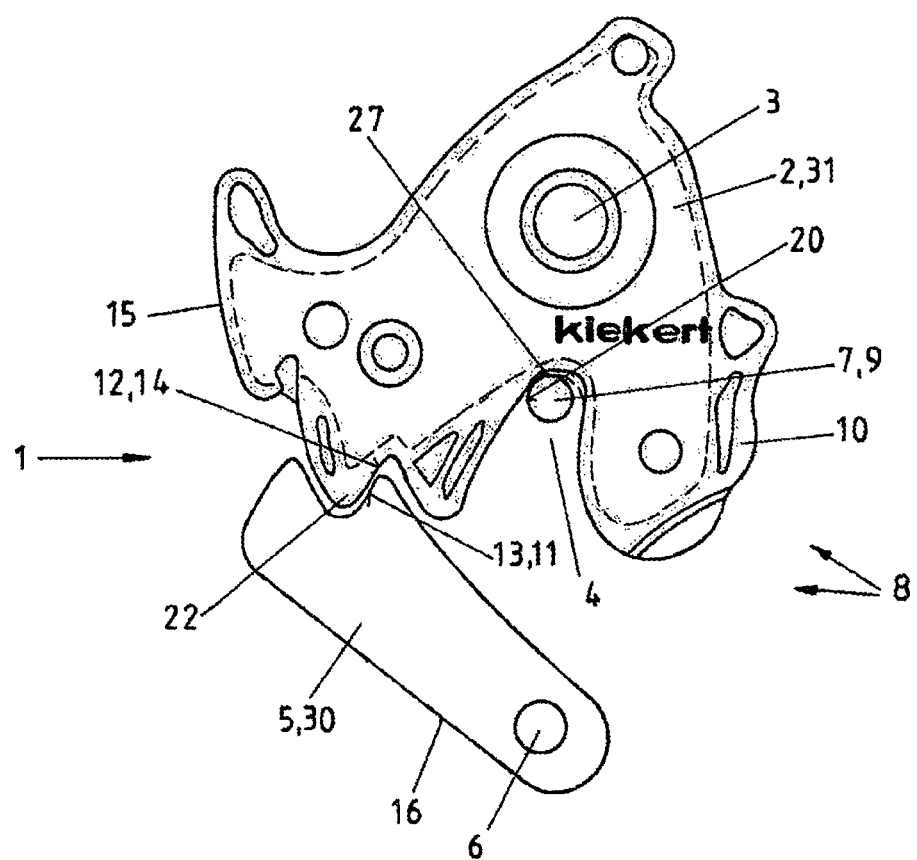
FIG. 1 a top view of a latch in the closed state

FIG. 1 shows the top view of a latch 1, in which the catch 2 moving around the axis 3 encompasses the bracket side 9 of the lock bracket 7. Here the closed state of a relevant latch 1 is therefore reproduced. The catch 2 is secured via the pawl 5 pivotable around the pawl axis 6, i.e. the latch 1 can only be reopened if the pawl 5 has previously been pivoted away, which is possible via the door handle not reproduced here. The bracket side 9 is propelled via the mounting 4 to the deep base 27 on the catch 2 and thus also ensures the closed state of the vehicle door not shown here, whereby the locking mechanisms 30, 31, i.e. the pawl 5 and the catch 2 are parts of the motor vehicle door, while the lock bracket 7 is immobilised with the bracket side 9 on the chassis of the motor vehicle.

The locking mechanisms 30, 31 of the lock 8 are produced in a multi-part stamping process from relevant sheet metal, whereby the surface is characterised by a stamping contour 14 on initially the two locking mechanisms 30, 31 on the ratchet surfaces 12, 13 kept free from the casing 10. However, this surface design is changed in the area of the ratchet surface 13 by reprocessing in which the stamping contour is changed as explained previously. This results in a contour marked with 11 which leads to a considerably more uniform friction of both locking mechanisms 30, 31 in the area of its ratchet surfaces 12, 13.

It is not emphasised in particular that the edges 15, 16 of the catch 2 and the pawl 5 are equipped with a plastic casing 10. The edges 10, 15, 16 are thus covered by such a casing 10. Only in the area of the ratchet surfaces 12, 13 and also the contact surface 20 is this casing 10 not present. Consequently, the selected surface structure can become effective as can be found in the following FIGS. 2-5. The surface structure which is explained hereafter ensures minimisation of noise and sliding friction which both interact.

FIG. 2 shows the area of the ratchet surface 12 on the catch 2 which must correspond with the ratchet surface 13 on the pawl 5 on opening and closure of the latch. This means that the two locking mechanisms 30, 31 even exert friction on one another during opening and closure of the latch 1 in the area of their ratchet surfaces 12, 13 or with regard to the edges 15, 16, which can lead to problems in particular with the straight grooves 17 shown in FIG. 2, if also the ratchet surfaces 13 on the pawl should demonstrate identical, i.e. straight grooves. However, this is prevented here as the comparison of FIGS. 2 and 3 shows; in which the contour 11 of the ratchet surface 13 is characterised by oblique or oblique running grooves 18, 19. These grooves 18, 19 in particular in the area of the main ratchet 22 (FIG. 2, 5) lead to reduction of the sliding friction and the resulting friction noises, because as clarified in FIG. 4, the stamping grooves 33, 33', 33" with the milling grooves 34, 35 only demonstrate a covering 25, 25' at a few points. The milling grooves 34, 35 are milling furrows which are inserted into the ratchet surface 13 of the pawl 5 via further processing. The milling grooves 34, 35 or also oblique grooves 18, 19 run at an angle 26 of 5-15°, preferably 5-8°. It is important that the portrayed covering 25, 25' occurs in order thus not to impair the movement of the pawl 5 on the catch 2 and to ensure uniform movement which leads to the desired noise reduction due to the few covering points.

FIG. 4 further clarifies that the milling grooves 34, 35 run or are arranged in opening direction 32 of the pawl 5. Consequently, they produce an additional effect when the pawl 5 is opened.

Finally, FIG. 5 shows a perspective view of a catch 2 which can be pivoted here around the axis 3 not shown here. When the catch 2 is pivoted, the bracket side 9 which is not reproduced in FIG. 5 is inserted into the mounting 4 or freed by this. Consequently, the vehicle door can be opened or closed and then be locked in the closed position. Pawl 5 also serves this purpose.

It is clearly recognisable in FIG. 5 that the stamping of the catch 2 leads to a clearly recognisable edge 15, the surface of which is marked by the stamping contour 14 on the ratchet surface 12 as explained above; This stamping contour 14 is only indicated here. The ratchet surface 12 identifies the main ratchet 22, i.e. the position in which the pawl 5 hinders the catch 2 in the closed position on a reverse pivot. Then, as also already mentioned, the ratchet surface 13 of the pawl 5 rests on the ratchet surface 12 of the catch 2. The catch 2 is then stressed by the door seal not depicted here and the opening spring which is also not depicted here. Consequently, a close fitting of the ratchet surfaces 12, 13 occurs.

In the deep base 27 of the mounting 4 it is recognisable that here a surface which deviates from the remaining surfaces of the edge 15 is present, which is attained in particular by no casing 10 being present here.

All stated characteristics, including those taken from the sketches alone, are viewed as crucial to the invention alone and jointly.

The invention claimed is:

1. A procedure to produce a catch and a pawl of a latch, the procedure comprising:
 stamping out the catch such that the catch has a first ratchet surface and stamping out the pawl such that the pawl has a second ratchet surface, wherein the stamping of the catch and pawl forms a plurality of stamped grooves on the first and second ratchet surfaces, wherein the plurality of stamped grooves are configured to be vertical or nearly vertical when the catch and pawl are installed in the latch for operational use, and wherein the first ratchet surface abuts the second ratchet surface when the latch is in a closed position,
 encasing each of the catch and the pawl in a respective casing, wherein the first and second ratchet surfaces are kept free of each of the respective casings, and
 after stamping out the catch and the pawl, processing one of the first or second ratchet surfaces with a tool which produces a plurality of oblique grooves which are angled between 5° and 15° relative to the plurality of stamped grooves, wherein each oblique groove intersects at least two of the plurality of stamped grooves of the other of the catch or the pawl when the latch is in the closed position, thereby reducing contact points between the catch and pawl during operation of the latch.

2. The procedure of claim 1, wherein in the further procedure step the oblique grooves are produced on the first or second ratchet surface with the tool via mechanical erosion.

3. The procedure of claim 1, wherein the oblique grooves are milled into the second ratchet surface on the pawl.

4. The procedure of claim 1, wherein oblique grooves moulded into the first or second ratchet surface of the catch or the pawl.

5. The procedure of claim 1, wherein after processing one of the first or second ratchet surfaces, processing the other of the first or second ratchet surfaces with oblique grooves in the first or second ratchet surface, the orientation of which is in an opposite, direction of the oblique grooves in the first or second ratchet surface processed in claim 1 and which results in each oblique groove on the first ratchet surface intersecting at least two oblique grooves on the second ratchet surface when the latch is in the closed position.

6. A latch with a catch and a pawl locking the catch in a closed position, wherein the catch and the pawl are produced by the procedure according to claim 1.

7. The procedure of claim 1, wherein the oblique grooves are more marked than the stamped grooves.

8. The procedure of claim 1, wherein the plurality of oblique grooves are angled between 5° and 8° relative to the plurality of stamped grooves.

9. The procedure of claim 1, wherein the first and second ratchet surfaces slide relative to each other when moving the latch to an open position from the closed position and wherein producing the plurality of oblique grooves on one of the first or second ratchet surfaces reduces sliding friction between the first and second ratchet surfaces compared to first and second ratchet surfaces each having a plurality of stamped grooves without one having the plurality of oblique grooves.

10. A latch comprising:
 a catch defining a first ratchet surface and a plurality of first stamped grooves, the plurality of first stamped grooves configured to be a plurality of first vertical stamped grooves when the latch is installed for operational use,
 a pawl defining a second ratchet surface that interacts with the first ratchet surface to hold the catch in a closed position, wherein the pawl defines a plurality of second stamped grooves, the plurality of second stamped grooves configured to be a plurality of second stamped vertical grooves when the latch is installed for operational use,
 a respective casing covering each of the catch and the pawl except for the first and second ratchet surfaces which are not covered by the respective casings, wherein one of the first or second ratchet surfaces defines a plurality of oblique grooves that are angled between 5° and 15° relative to the first or second vertical stamped grooves, thereby reducing contact points between the catch and pawl during operation of the latch.

11. The latch of claim 10, wherein oblique grooves are milled on the second ratchet surface of the pawl.

12. The latch of claim 11, wherein the angle between the straight stamping grooves and the oblique grooves is dependent on a thickness of the catch or pawl and a distance of the vertical stamping grooves.

13. The latch of claim 11, wherein the angle between the vertical stamping grooves and the oblique grooves is 5-8°.

14. The latch of claim 10, wherein the oblique grooves on the first or second ratchet surfaces of the catch or pawl are configured to prevent interlocking of the first and second vertical stamping grooves.

15. The latch of claim 11, wherein the oblique grooves on the first or second ratchet surfaces of the catch or pawl are configured to prevent interlocking of the first and second vertical stamping grooves.

16. The latch of claim 15, wherein the angle between, the straight stamping grooves and the oblique grooves is dependent on a thickness of the catch or pawl and a distance of the vertical stamping grooves and is between 5-8°.

17. The procedure of claim 10, wherein the oblique grooves are more marked than the stamped grooves.

18. The latch of claim 16, wherein the oblique grooves in the opening direction of the pawl are arranged in an inclined manner.

* * * * *